United States Patent [19]

Britt

[11] Patent Number: 4,562,852
[45] Date of Patent: Jan. 7, 1986

[54] SAFETY VALVE

[76] Inventor: Franklin J. Britt, 3744 Hartland Rd., Gasport, N.Y. 14067

[21] Appl. No.: 642,201

[22] Filed: Aug. 20, 1984

[51] Int. Cl.$^4$ .................. F16K 17/40; F16K 43/00
[52] U.S. Cl. .................................. 137/68.1; 137/329.3; 137/614.2; 137/901; 222/3; 222/545
[58] Field of Search .................. 137/68 R, 70, 329.1, 137/329.2, 329.3, 522, 614.2, DIG. 2; 222/3, 396, 397, 501, 545

[56] References Cited

U.S. PATENT DOCUMENTS 2,391,017 12/1945 Grontkowski .............. 137/DIG. 2
2,945,503 7/1960 Atkinson ..................... 137/68 R
3,618,626 11/1971 Russo ......................... 137/68 R
3,645,286 2/1972 Follett ........................ 137/68 R
4,077,422 3/1978 Brinkley ..................... 137/68 R

FOREIGN PATENT DOCUMENTS 453571 12/1948 Canada ...................... 137/329.3
84089 12/1957 Denmark ................... 137/329.3

Primary Examiner—George L. Walton
Attorney, Agent, or Firm—Christel, Bean & Linihan

[57] ABSTRACT

A combination safety and service valve including a body having a sealing portion for closing an opening in a high-pressure tank and an external portion which, when the sealing portion closes the tank opening, is positioned externally of the tank utilizes a ball chamber in its flow passage and a spherical ball loosely received in the chamber for preventing the escape of contents of the tank if the external portion were to separate from the sealing portion. The ball chamber is adapted to sealingly accept the ball at its outlet end, and the ball is of such size that a pressure differential across the ball chamber urges the ball into sealing engagement with the ball chamber outlet. A stem associated with the external portion of the valve body prevents the ball from engaging the chamber outlet end until the external portion is separated from the sealing portion.

15 Claims, 4 Drawing Figures

SAFETY VALVE

BACKGROUND OF THE INVENTION

This invention relates, in general, to a service valve for a tank and relates more particularly, to a combination safety and service valve for a high-pressure tank.

The combination safety and service valve with which this invention is to be compared is utilized with a high-pressure tank or container such as is used for storing gas for welding. Such a valve commonly includes a body having a sealing portion which is adapted to close an opening in the tank and has another portion which, when the sealing portion closes the tank opening, is positioned externally of the tank. The valve body also defines a flow passage through which the tank is emptied or filled.

Also included in such a combination safety and service valve are safety means for preventing the sudden escape of contents of the high-pressure tank if the external portion of the valve is broken off. Each of such safety means includes a secondary valve positioned internally of the sealing portion for closing the flow passage therein and biasing means for biasing the components of the secondary valve into a condition at which the flow passage is closed. Means are also included for preventing, until the valve breaks, the secondary valve from closing. Examples of prior art combination safety and service valves in which such safety means are utilized are shown and described in U.S. Pat. Nos. 3,930,515 and 4,077,422. Secondary valves described in each of the referenced patents include a cylindrical plug adapted to engage a flat seating surface to thereby close the flow passage.

Commonly, however, the safety means of prior art valves are relatively complicated in construction and are, therefore, relatively costly to manufacture. Furthermore, it is not believed that the dependability of prior art valves, at least those which utilize a cylindrical plug in its secondary valve, is very great. If, for example, the cylindrical plug becomes tilted in relationship to the flat seating surface so that subsequent engagement therebetween does not properly close the flow passage, the safety valve does not prevent the escape of contents of the tank.

Accordingly, an object of the present invention is to provide a new and improved safety and service valve for utilization with a high-pressure tank.

Another object of the present invention is to provide such a safety and service valve which is uncomplicated in structure and which can be easily and economically manufactured.

Still another object of the present invention is to provide such a valve which is highly dependable in operation.

SUMMARY

This invention resides in new and improved combination safety and service valve for a high-pressure tank.

The combination safety and service valve includes a body having a sealing portion for closing an opening in the tank and an external portion which, when the sealing portion closes the tank, is positioned externally of the tank. The sealing portion defines an inlet port, and the external portion defines an outlet port. The body defines a flow passage extending between the inlet and the outlet ports so that a portion of the flow passage is provided by the sealing portion of the body and another portion of the flow passage is provided by the external portion of the body. The portion of the flow passage provided by the sealing portion includes a ball chamber having an inlet end and an outlet end. A ball is loosely received by the ball chamber and is adapted to engage the outlet end thereof to thereby close the flow passage. The ball is of such size that when the fluid pressure at the ball chamber inlet end is higher than the fluid pressure at the ball chamber outlet end, the ball is biased into engagement with the outlet end of the ball chamber. An actuatable valve member is connected to the external portion of the body for movement into and out of the flow passage for opening and closing the passage and includes means for preventing the ball from engaging the ball chamber outlet end until the external portion is separated from the sealing portion.

DETAILED DESCRIPTION OF AN ILLUSTRATIVE EMBODIMENT

Figure 1:
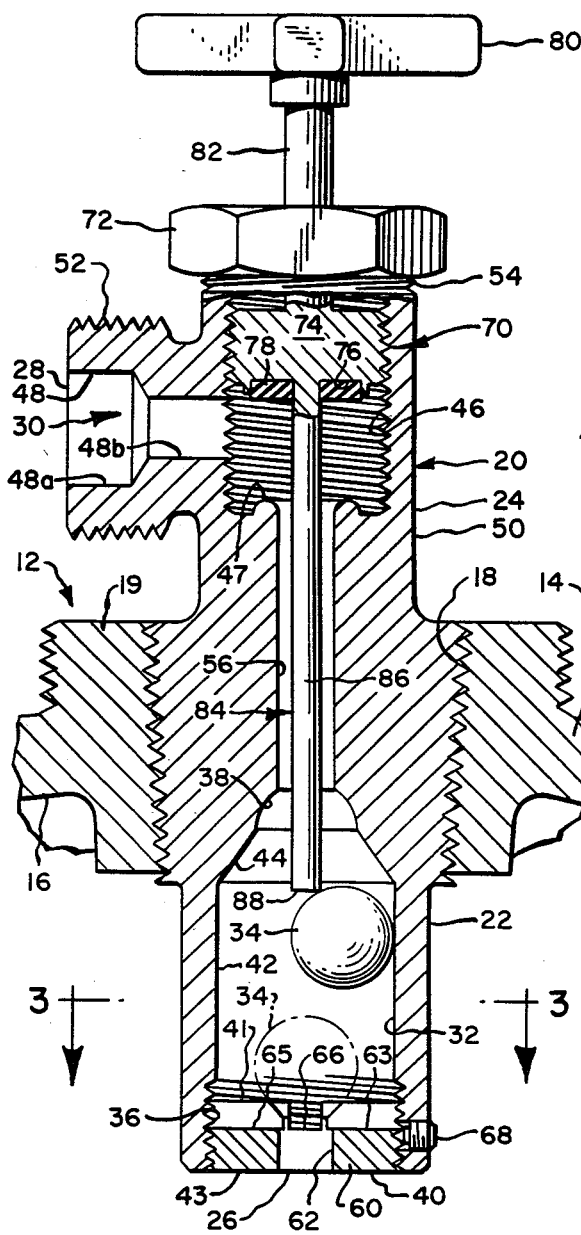
FIG. 1 is a longitudinal cross-sectional view of an embodiment of a safety and service valve in accordance with the present invention shown operatively positioned in a high-pressure tank.

Referring now to the drawings in greater detail and considering first FIG. 1, there is shown a combination safety and service valve in accordance with the present invention and indicated generally by the reference numeral 10. The valve 10 is particularly adapted for utilization with a tank 12 of the type used to store fluids at high pressure. The high-pressure tank 12 includes an outer metal, hollow shell 14 having an interior wall 16 which surrounds the tank interior. Access to the tank interior is provided by single, internally-threaded opening 18 defined by the tank shell 14. The shell 14 also includes an externally-threaded section 19 which is adapted to accept a removable protective cap (now shown) for protecting the valve 10 during transportation of the tank 12.

The safety and service valve 10 includes a body generally indicated 20 and constructed of suitable material, such as brass, which is capable of withstanding high pressures within the tank 12. The body 20 has a sealing portion 22 which is externally threaded so as to be operatively, or threadably, received by the threaded opening 18 of the tank shell 14 and an external portion 24 which, as shown in FIG. 1, is positioned externally of the tank 12 when the sealing portion 22 is received by the tank opening 18. It will be understood that when the sealing portion 22 is operatively received by the opening 18, the opening 18 is closed and sealed.

As shown in FIG. 1, the sealing portion 22 is generally elongated in shape and relatively cylindrical from one end, or its upper end as shown, to its other, or lower, end. The external portion 24 has a major section 50 which is generally cylindrical and elongated in shape and which has a longitudinal axis which is aligned with that of the sealing portion 22. The external portion 24 further has a relatively cylindrical arm section 52 which extends generally perpendicularly from the major section 50. The arm section 52 is externally threaded to accept a hose or pipe in a manner well known in the art, and the upper end, indicated 54, of the major section 50 is externally threaded for accepting a threaded cap 72. A valve inlet portion 26 is defined at the lower end of the sealing portion 22, and a valve outlet portion 28 is defined by the arm section 52 of the external portion 24.

Defined in the body 20 is a flow passage 30 which extends between the valve inlet port 26 and outlet port 28 and through which the tank 12 is emptied or filled. Inasmuch as the flow passage 30 extends between the inlet and outlet ports 26 and 28, respectively, it will be understood that a portion of the flow passage 30 is defined by the sealing portion 22, and another portion of the flow passage 30 is defined by the external portion 24.

Figure 2:
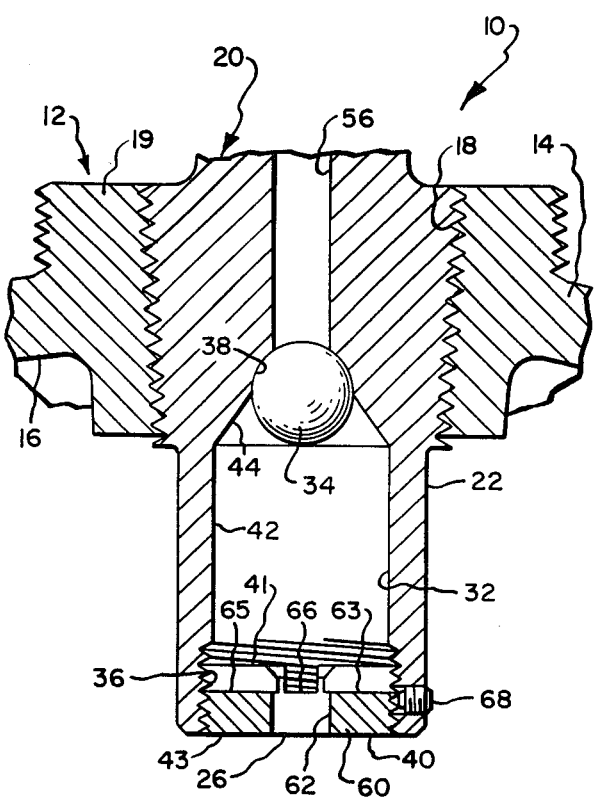
FIG. 2 is a view similar to FIG. 1 illustrating the position of the valve ball when preventing the escape of contents of the tank and when the portion of the valve shown external to the tank in FIG. 1 is broken away from the remainder of the valve.

In accordance with the present invention and with reference to FIGS. 1 and 2, a ball chamber 32 is defined in the portion of the flow passage 30 provided by the sealing portion 22. Loosely captured within the ball chamber 22 is a spherical ball 34. The ball chamber 32 has an inlet end 36 at its lower end as shown and an outlet end 38 at its upper end as shown. The inlet end 36 of the ball chamber 32 is internally-threaded for threadably receiving an insert member 40, hereinafter described. The ball chamber 32 has a bored, cylindrical portion 42 which extends from the inlet end 36 of the ball chamber 32 to a location near its outlet end and its outlet end 38 is adapted to sealing accept, in the manner shown in FIG. 2, a portion of the ball 34 to thereby close the flow passage 30. More specifically, the shape of the chamber outlet end 38 is complementary to that of a portion of the surface of the ball 34 so that when the ball is accepted by the outlet end 38, the surface of the ball 34 and outlet end 38 sealingly engage one another over a relatively large area. Both of the bored, cylindrical portion 42 and shape of the outlet end 38 can be formed by a drilling process.

Figure 3:
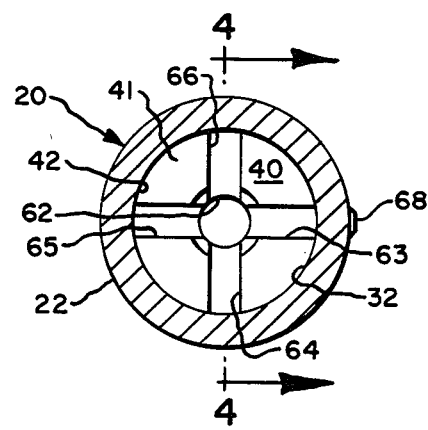
FIG. 3 is a cross-sectional view taken about on line 3—3 of FIG. 1.
Figure 4:
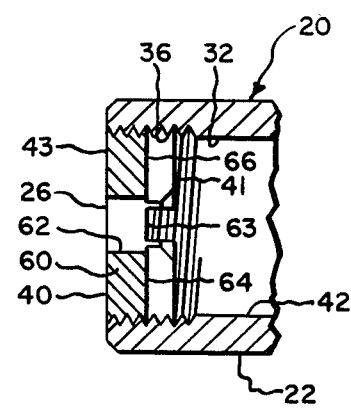
FIG. 4 is a cross-sectional view taken about on line 4—4 of FIG. 3.

Referring to FIGS. 1, 3 and 4, the insert member 40, introduced above, is shown threadably received by the internally-threaded end of the ball chamber 32. The insert member 40 includes a substantially cylindrically-shaped body 60 having a radially outwardly-facing surface which is externally-threaded from one end indicated 41, to the other end indicated 43. Defined through the insert member body 60 is a cylindrical bore 62, and defined at its end 41 are four radially-directed grooves 63, 64, 65, 66. As best shown in FIG. 3, two slots 63,65 are aligned with one another and the other two slots 64,66 are aligned with one another. Furthermore, the two slots 63,64 are oriented generally perpendicular to the other two slots 64,66. The insert member 40 is tightly retained in the threaded end of the ball chamber 32 by means of a set screw 68.

The insert member bore 62 is chamfered at the slotted end 41 of the insert member body 60, and during an operation in which the tank 12 is filled, the ball 34, as shown in phantom, rests upon the chamfer. It will be understood, however, that when the ball 34 rests upon the chamfer, the bore 62 communicates with the cavity of the ball chamber 32 through the insert member slots 64, 64. Thus, flow of fluid through the valve inlet port 26 and into the tank interior 16 is not hampered by the ball 34.

Referring again to FIGS. 1 and 2, the ball 34 is comprised of any of several suitable materials, such as steel, nonporous rubber or plastic and, as discussed above, is adapted to be sealingly accepted by the outlet end 38 of the ball chamber 32. The diameter of the ball 34 is smaller than that of the cylindrical portion 42 of the ball chamber 32 so that fluid flow around the ball 34 is easily permitted, and the diameter of the ball 34 is large enough so that its escape from the ball chamber 32 through the insert member 40 or flow passage 30 is prevented.

The ball is relatively light in weight so that when the fluid pressure at the inlet end 36 of the ball chamber 32 is slightly greater than the fluid pressure at the outlet end 38 of the ball chamber 32, the ball is urged into sealing engagement with the outlet end 38 by the difference between the fluid pressures.

The portion of the flow passage 30 is provided by the external portion 24 is defined in part, by a portion of an internally-threaded bore 46 extending downwardly into the major section 50 from the upper end 54 thereof and a passageway 48 extending between the valve outlet portion 28 and a side of internally-threaded bore 46. At the lower end of the internally-threaded bore 46 is defined an upwardly-directed ringlike rim or ridge 47. The passageway 48 is provided by aligned bores 48a and 48b as shown.

The body 20 further defines a bore 56 which extends between the outer end 38 of the ball chamber 32 and the internally-threaded bore 46. Furthermore, the diameter of the bore 56 is smaller than that of either the cylindrical portion 42 of the ball chamber 32 or the internally-threaded bore 46.

Referring again to FIG. 1, the valve 10 also includes valving means for opening and closing the flow passage 30 during normal valving operations. Such valving means includes a actuatable valve member, indicated 70, which is connected to the external portion 24 of the valve body 20. The valve member 70 includes an externally-threaded plug portion 74 which is threadably received by the internally-threaded bore 46 and which defines a circular recess 76 in its lower surface 48. Snuggly received by the recess 76 is a rubber washer 78. The valve member also includes a handwheel 80 for actuation of the valving means. The handwheel 80 is connected to the plug portion 74 by means of a shaft 82 which extends through a central opening in the cap 72.

It will be understood that rotation of the handwheel 80 relative to the valve body 20 moves the plug portion 74 of the valve member 70 relative to and across the passageway 48 of the arm section 52. Thus, movement of the valve member 70 relative to the internally-threaded opening 46 moves the plug portion 74 into and out of the flow passage 30, or up and down as shown in FIG. 1, to thereby control the flow of fluids through the passage 30. When the valve member 70 is so positioned within the opening 46 so that its rubber washer 78 sealingly engages the ringlike ridge 47, flow through the passage 30 is completely shut off.

In accordance with the present invention and with reference still to FIG. 1, the valve 10 includes stop means, generally indicated 84, for preventing the ball 34 from engaging the outlet end 38 of the ball chamber 32 during normal valving operations. The stop means 84 of the valve 10 is provided by a stem-shaped portion, indicated 86, of the valve member 70 which extends from the lower surface of its plug portion 74 and through the passageway bore 56 so that its end, indicated 88, is positioned within the ball chamber 32. Positioned within the ball chamber 32, the end 88 of the stem portion 86 is oriented generally between the ball 34 and the outlet end 28 of the ball chamber 34.

During a normal valving operation in which the tank is emptied, the ball 34 is biased by the pressure differential between the inlet and outlet ends of the ball chamber 32 toward engagement with the outlet end 28. However, the end 88 of the stem portion 86 retains the ball 34 in its FIG. 1 solid-line condition and thereby prevents the ball 34 from engaging the chamber outlet end 28.

As shown in FIG. 1, the stem portion 86 is an integral extension of the valve member 70 so that the end 88 of the stem portion 86 moves up or down relative to and within the ball chamber 32 as the plug portion 74 is moved up or down relative to and within the internally-threaded bore 46. The diameter of the stem portion 86 is smaller than the passage bore 56 through which it is received so that fluids entering or leaving the tank 12 easily flow between the stem portion 86 and the walls of the passage bore 56.

If the external portion 24 of the valve body 20 were to break away and separate from the sealing portion 22, fluid contained under pressure within the tank rushes through the ball chamber 32, as a result of the fluid pressure drop thereacross, to escape through the passage bore 56. However, separation of the external portion 24 from the sealing portion 22 withdraws the end 88 of the stem portion 86 from the ball chamber 32 so that the stem portion 86 no longer prevents the ball 34 from engaging the chamber outlet end 38. Thus, the fluid attempting to exit the tank through the passage bore 56 pushes the ball 34 into sealing engagement with the chamber outlet end 38 so that the passage bore 56 is shut off. It will be understood, therefore, that the valve 10 provides means for preventing unwanted escape of contents from the tank 12 if the external portion 24 and the sealing portion 22 were to separate and prevents any damage to property or injury to persons which could result from such separation.

The aforesaid valve 10 is advantageous in that it is relatively uncomplicated in structure, can be assembled quickly and with relative ease, and is highly dependable in operation. Furthermore, its uncomplicated structure reduces the likelihood that at time of assembly, a valve component will be improperly installed so that it fails to operate when required to do so.

While the present invention has been described in an illustrative embodiment, it will be understood that numerous modifications or substituions can be had without departing from the spirit of the invention. For example, although the stop means, or stem portion 86, of the valve 10 has been shown and described as being connected to the external portion 24 of the valve by means of the plug portion 74, the stop means can be connected directly to the external portion 24 in accordance with the broader aspects of the invention. Such stop means can include a thin stem or rod fixedly attached, as by welding, to a wall of the passage bore 56 in the external portion 24 of the valve body so that the stem or rod extends through the passage bore 56 and into the ball chamber 32. Accordingly, the present invention has been described in an illustrative embodiment by way of illustration rather than limitation.

I claim:

1. A combination safety and service valve for a high-pressure tank, said valve comprising:

a body having a sealing portion positioned within the tank and an external portion positioned externally of the tank, said sealing portion defining an inlet port, said external portion defining an outlet port, said body defining a flow passage extending between said inlet and said outlet ports so that a portion of said flow passage is provided by said sealing portion and another portion of said flow passage is provided by said external portion of said body, said portion of said flow passage provided by said sealing portion including a ball chamber, said ball chamber having an inlet end and an outlet end, said outlet end having a contoured surface positioned within the tank opening between an inlet and an outlet of the tank opening;

a spherical ball being loosely received by said ball chamber and adapted to engage said contoured surface to thereby close said flow passage, said ball being of such size that when the fluid pressure at said ball chamber inlet end is higher than the fluid pressure at said ball chamber outlet end, about one-half of said ball is biased into engagement with said contoured surface of said ball chamber and substantially all of said ball being disposed within the tank opening between said inlet and said outlet of the tank opening;

an actuatable valve member connected to said external portion of said body for opening and closing said flow passage; and stop means associated with said valve member for preventing said ball from engaging said contoured surface in all open positions of said valve member until said external portion of said body is severed from said sealing portion.

2. A combination safety and service valve as defined in claim 1 wherein the outlet end of said ball chamber is shaped complementary to that of a portion of the surface of said ball.

3. A combination safety and service valve as defined in claim 1 further comprising an insert member being received by said inlet end of said ball chamber for preventing said ball from coming out of said inlet end of said ball chamber, said insert member defining a passageway through which said valve inlet port communicates with said ball chamber.

4. A combination safety and service valve as defined in claim 3 wherein said insert member has one end which faces generally inwardly of said ball chamber and another end which faces generally outwardly of said inlet port, said insert member defining a bore between its two ends and at least one slot in said one end which communicates with said insert member bore and said insert member passageway including said insert member bore and said insert member slot.

5. A combination safety and service valve as defined in claim 1 wherein said stop means includes stem means defining an end portion which extends into said ball chamber and is positioned generally between said ball and said outlet end of said ball chamber.

6. A combination safety and service valve as defined in claim 5 wherein said actuatable valve member includes a plug portion mounted within said external portion for movement into and out of said flow passage and said stem means is connected to said plug portion.

7. A combination safety and service valve as defined in claim 6 wherein said flow passage includes a substantially straight section between said chamber outlet end and said plug portion and said stem menas includes a stem which extends through said straight section of said flow passage and into said ball chamber.

8. A combination safety and service valve as defined in claim 7 wherein said external portion defines an internally-threaded bore which provides a part of said flow passage and said plug portion is threadably received by said internally-threaded bore so that actuation of said valve member moves said plug portion relative to and within said internally-threaded bore.

9. A combination safety and service valve as defined in claim 8 wherein plug portion has a central axis, said plug portion central axis is aligned with the central axis of said straight section of said flow passage and said stem is so attached to said plug portion that the central axis of said stem aligns with said central axis of said plug portion.

10. A combination safety and service valve as defined in claim 9 wherein said stem and said plug portion are formed integrally with one another.

11. In a combination safety and service valve for a high pressure tank having a valve body including a sealing portion and to thereby be positioned non-externally of the tank, an external portion positioned externally of the tank, an inlet port in said sealing portion, an outlet port in said external portion, a flow passage extending from said inlet port to said outlet port through said sealing and external portions, and an actuatable valve member connected to said external portion for opening and closing said flow passage, the improvement comprising:

(a) a ball chamber being defined in said flow passage and between said inlet port and said external portion, said ball chamber having an inlet end and an outlet end, said outlet end having a contoured surface positioned within the tank opening between an inlet and an outlet of the tank opening, (b) a ball loosely received by said ball chamber and adapted to sealingly engage said contoured surface to thereby close said flow passage, said ball being of such size that when the fluid pressure at said chamber inlet end is higher than the fluid pressure at said ball chamber outlet end, about one-half of said ball is biased toward a condition at which said ball sealingly engages said contoured surface chamber outlet end and substantially all of said ball being disposed within the tank opening between said inlet and said outlet of the tank opening, and (c) stop means associated with said valve member for preventing said ball from engaging said contoured surface in all open positions of said valve member until said external portion is severed from said sealing portion.

12. The improvement of claim 11 wherein said ball chamber outlet end is shaped complementary to that of a portion of said ball.

13. The improvement of claim 11 wherein said stop means is connected to said external portion by means of said valve member and includes ball-retention means which are positioned generally between said ball and said chamber outlet end until the displacement of said valve member from normal valving positions.

14. The improvement of claim 13 wherein said stop means includes a stem-shaped portion extending through said flow passage and into said ball chamber, said stem-shaped portion defining an end, and said ball-retention means being defined by said portion end.

15. In combination,
a high pressure tank defining an opening through which said tank is filled and emptied, and
a safety and service valve including
(a) a body having a sealing portion positioned within said tank opening and an external portion positioned externally of the tank, said sealing portion defining an inlet port, said external portion defining an outlet port, said body defining a flow passage extending between said inlet and said outlet ports so that a portion of said flow passage is provided by said sealing portion and another portion of said flow passage is provided by said external portion of said body, said portion of said flow passage provided by said sealing portion including a ball chamber, said ball chamber having an inlet end and an outlet end, said outlet end having a contoured surface positioned within said tank opening between an inlet and an outlet of the tank opening;
(b) a spherical ball being loosely received by said ball chamber and adapted to engage said contoured surface to thereby close said flow passage, said ball being of such size that when the fluid pressure at said ball chamber inlet end is higher than the fluid pressure at said ball chamber outlet end, about one-half of said ball is biased into engagement with said contoured surface of said ball chamber and substantially all of said ball being disposed within the tank opening between said inlet and said outlet of the tank opening;
(c) an actuatable valve member connected to said external portion of said body for opening and closing said flow passage; and
(d) stop means associated with said valve member for preventing said ball from engaging said contoured surface in all open positions of said valve member until said external portion of said body is severed from said sealing portion.

* * * * *